United States Patent
Kobayashi et al.

[11] Patent Number: 6,089,140
[45] Date of Patent: Jul. 18, 2000

[54] BRAKE BOOSTER

[75] Inventors: Isao Kobayashi, Saitama-Ken; Mamoru Sawada; Yuzo Imoto, both of Aichi-Pref, all of Japan

[73] Assignees: Jidosha Kiki Co., Ltd., Tokyo; Denso Corporation, Aichi-Pref, both of Japan

[21] Appl. No.: 09/233,582

[22] Filed: Jan. 19, 1999

[30] Foreign Application Priority Data

Jan. 13, 1998 [JP] Japan .................................. 10-048726
Feb. 13, 1998 [JP] Japan .................................. 10-048725
Dec. 11, 1998 [JP] Japan .................................. 10-352322
Dec. 11, 1998 [JP] Japan .................................. 10-352324

[51] Int. Cl.$^7$ ...................................................... F15B 9/10
[52] U.S. Cl. .......................... 91/369.1; 91/376 R; 91/434; 60/552
[58] Field of Search .............................. 91/369.1, 376 R, 91/434; 60/552

[56] References Cited

U.S. PATENT DOCUMENTS 3,152,518 10/1964 Ayers .
5,233,907 8/1993 Gautier et al. ........................ 91/376 R
5,802,952 9/1998 Ikeda .

FOREIGN PATENT DOCUMENTS 10-16755 1/1998 Japan .
10-16759 1/1998 Japan .

*Primary Examiner*—F. Daniel Lopez
*Attorney, Agent, or Firm*—Flynn, Thiel, Boutell & Tanis, P.C.

[57] ABSTRACT

A brake booster which permits an axial relative movement between a power piston and a valve body is disclosed. An arrangement is made which prevents a brake reaction from being transmitted to a brake pedal. As an alternative therefor, pseudo-reaction imparting means transmits a pseudo-reaction to a brake pedal. A rear end of the valve body is covered by a tubular cover and bellows connected thereto, and its internal space is maintained in communication with a constant pressure chamber. The bellows has an effective diameter which is chosen to be of an equal size to the diameters of a vacuum valve seat and an atmosphere valve seat. This allows a pseudo-reaction and a brake pedal stroke to be obtained which depend on the force with which a brake pedal is depressed if a negative pressure within the constant pressure chamber varies, thus imparting a better brake feeling to a driver.

6 Claims, 7 Drawing Sheets

BRAKE BOOSTER

FIELD OF THE INVENTION

The invention relates to a brake booster, and more particularly, to a brake booster which permits an axial relative movement between a valve body and a power piston.

DESCRIPTION OF THE PRIOR ART

A brake booster is known in the art including a tubular valve body slidably disposed within a shell and having a rear end, the outer periphery of which slidably extends through an opening in the shell while maintaining a hermetic seal, a power piston mounted on the valve body, a constant and a variable pressure chamber defined across the power piston, a valve mechanism disposed within the valve body, a constant pressure passage which provides a communication between the valve mechanism and the constant pressure chamber, a variable pressure passage which provides a communication between the valve mechanism and the variable pressure chamber, an atmosphere passage which provides a communication between the valve mechanism and the atmosphere, an input shaft coupled to the valve mechanism and is adapted to be driven back and forth in response to a brake pedal, and an output shaft driven forward as the valve body is driven forward, an axial relative movement being permitted between the valve body and the power piston, and the valve mechanism including a vacuum valve seat formed on the inner periphery of the valve body, a valve plunger slidably fitted into the valve body and coupled to the input shaft, an annular atmosphere valve seat formed on a rear part of the valve plunger, and a valve element urged forwardly by a spring for movement into engagement with or disengagement from the both valve seats.

In a conventional brake booster as mentioned above, as a brake pedal is depressed, the valve mechanism is operated to allow the atmosphere to be introduced into the variable pressure chamber. This allows a pressure differential between the atmosphere introduced into the variable pressure chamber and a negative pressure in the constant pressure chamber to drive the power piston and the valve body forward, thereby enabling an output to be obtained which depends on the force of depression of the brake pedal. An arrangement is made which allows an axial relative movement between the power piston and the valve body, so that when the brake booster is actuated, the stroke or the travel by which the valve body is driven forward can be reduced as compared with the stroke of the power piston. This allows the depression stroke of the brake pedal to be reduced.

In a conventional arrangement, the amount of relative movement between the power piston and the valve body as the brake booster is actuated is substantially determined by a pressure differential between the atmospheric pressure within the variable pressure chamber which acts upon the valve body to urge it rearward and the atmosphere outside the shell which acts on the valve body to urge it forwardly.

On the other hand, a brake booster is constructed such that an equal output is delivered as long as the force with which the brake pedal is depressed remains the same. However, it is to be noted that a negative pressure which is introduced into the constant pressure chamber does not remain constant, but may vary.

Accordingly, as the brake booster is actuated, a variation in the negative pressure introduced into the constant pressure chamber results in a variation in the pressure differential between the atmospheric pressure within the variable pressure chamber and the atmospheric pressure outside the shell, both of which act upon the valve body, despite the fact that a same output should be obtained when the brake pedal is depressed with the equal force. When the pressure differential varies in this manner, the amount of relative movement between the power piston and the valve body or the depression stroke of the brake pedal varies when the same output should be delivered for the same force of depression.

It will thus be seen that in a conventional arrangement, while an equal output should be delivered for the same force of depression, a variation in the magnitude of the negative pressure introduced into the constant pressure chamber results in a varying depression stroke of the brake pedal, thus disadvantageously degrading a brake feeling experienced by a driver.

SUMMARY OF THE INVENTION

In view of the foregoing, according to a first invention, there is provided a brake booster of the type mentioned above in which an arrangement is made such that a reaction applied to the output shaft is prevented from being transmitted to the valve plunger as the brake booster is actuated, and a reaction piston is slidably mounted on either the power piston or the valve body in combination with pseudo-reaction imparting means which transmits to the valve plunger a pseudo-reaction obtained from the reaction piston when it is urged by the difference between the pressures prevailing in the variable pressure chamber and the constant pressure chamber, further comprising a tubular cover connected to the opening of the shell and surrounding a rear tubular portion of the valve body, and bellows disposed between a rear end of the tubular cover and an end of the valve element which is fitted into the inner periphery of the valve body, a space defined between the tubular cover and the bellows communicating with the constant pressure chamber, the diameter of the vacuum valve seat, the diameter of the atmosphere valve seat and the effective diameter of the bellows being chosen to have a substantially equal size.

In accordance with a second invention, there is provided a brake booster of the type mentioned above in which an arrangement is made which prevents a reaction applied to the output shaft from being transmitted to the valve plunger as the brake booster is actuated and in which a reaction piston is slidably mounted on either the power piston or the valve body in combination with pseudo-reaction imparting means which transmits to the valve plunger a pseudo-reaction obtained from the reaction piston when it is urged by the difference between the pressures prevailing in the variable pressure chamber and the constant pressure chamber, the valve body having an external diameter, at a location where it extends through the opening of the shell, which is chosen to be substantially equal to the diameter of the atmosphere valve seat.

According to the first invention, as the brake booster is actuated, a reaction which is applied to the output shaft is prevented from being transmitted through the valve plunger, the input shaft and the brake pedal to a driver. On the other hand, the pseudo-reaction imparting means allows a pseudo-reaction which depends on the magnitude of the force with which the brake pedal is depressed to be imparted to the brake pedal. The space defined by the cover and the bellows communicates with the constant pressure chamber. The diameter of the vacuum valve seat, the diameter of the atmosphere valve seat and the effective diameter of the bellows are of an equal size. Accordingly, as the brake booster is actuated, the pressure differential between the atmospheric pressure within the variable pressure chamber and the atmospheric pressure outside the shell, which act upon the valve body, can be reduced substantially to zero. This allows the depression stroke of the brake pedal to have a constant value which depends on the force with which the brake pedal is depressed or the output from the brake booster for an arrangement of the brake booster which provides an equal output for the same force of depression, if a variation in the negative pressure in the constant pressure chamber occurs as the brake booster is actuated to cause a variation in the pressure differential between the atmospheric pressure within the variable pressure chamber and the atmospheric pressure outside the shell. In this manner, a good brake feeling, which is improved over the prior art, can be imparted to a driver.

According to the second invention, the valve body has an external diameter, at a location where it extends through the opening of the shell, which is substantially equal to the diameter of the atmosphere valve seat, whereby the pressure differential between the atmospheric pressure within the variable pressure chamber and the atmospheric pressure outside the shell, both acting upon the valve body, to be substantially reduced to zero as the brake booster is actuated. In this manner, a good brake feeling, which is improved over the prior art, can be imparted to a driver as according to the first invention.

Above and other objects, features and advantages of the invention will become apparent from the following detailed description of the invention with reference to the attached drawings.

DETAILED DESCRIPTION OF THE EMBODIMENTS

Figure 1:
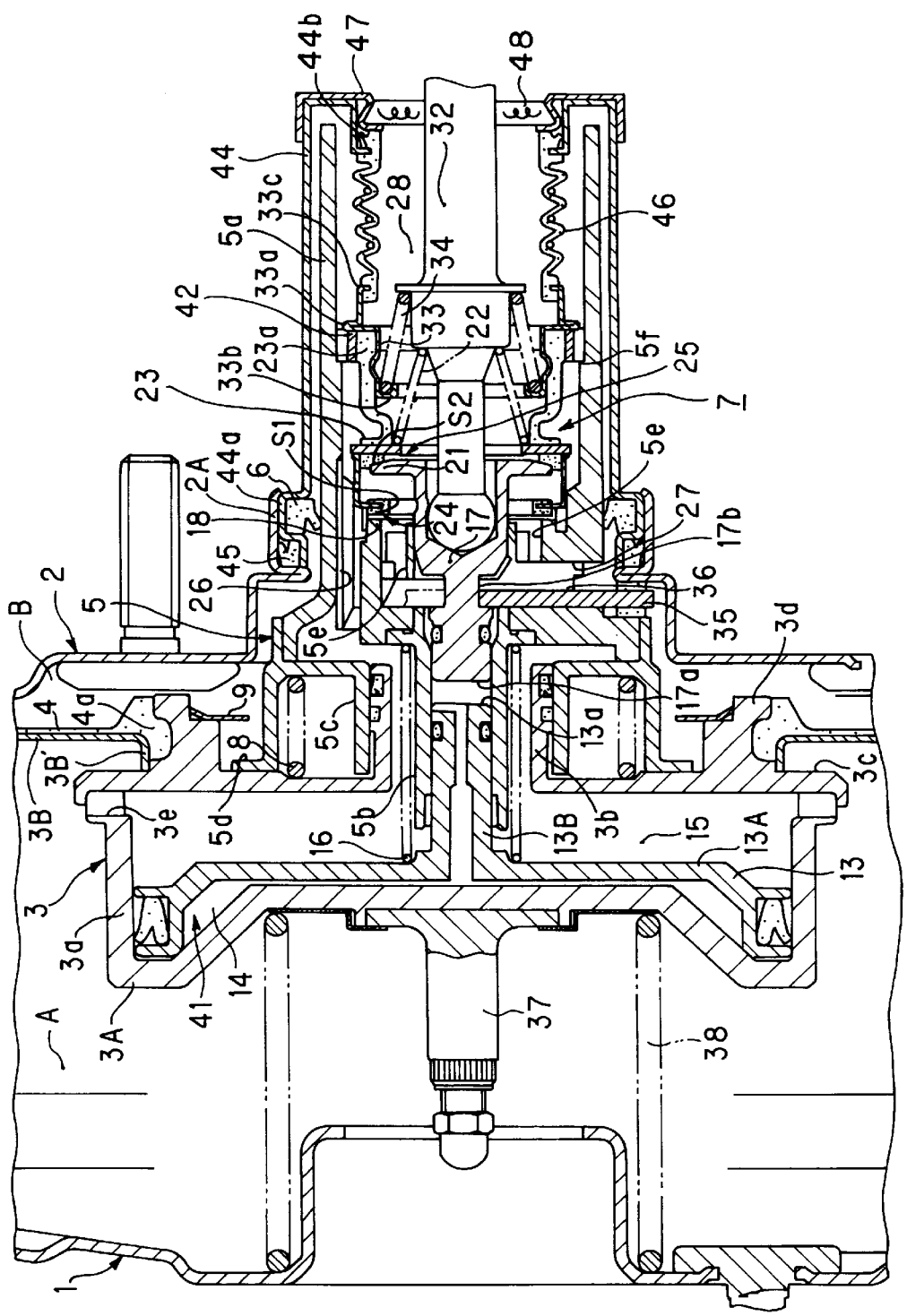
FIG. 1 is a longitudinal section of one embodiment of the invention.

Referring to the drawings, several embodiments of the invention will now be described. Initially referring to FIG. 1, there is shown a brake booster according to a first embodiment of the invention including an enclosed vessel formed by a front shell 1 and a rear shell 2 and in which a power piston 3 is slidably mounted. In the present embodiment, the power piston 3 comprises a bottomed, tubular, stepped cylinder member 3A, and a dish-shaped plate member 3B connected to the outer periphery of the cylinder member 3A.

The stepped cylinder member 3A is disposed in the enclosed vessel so that its bottom is located on the front side while opening in the rearward direction. The cylinder member 3A includes a portion 3a of an increased diameter which is located toward the bottom and a portion 3b of a reduced diameter which is located toward the opening. The portions 3a and 3b of different diameters are joined together by a stepped end face 3c which is formed with a tubular outer periphery 3d which surrounds the portion 3b of a reduced diameter.

The tubular outer periphery 3d is formed with an annular groove in its outer peripheral surface. The plate member 3B includes a tubular inner periphery 3B', which is fitted around the tubular outer periphery 3d from the rear side to define an annular space together with the annular groove, in which a bead 4a extending around the inner periphery of a diaphragm 4 is disposed as a press fit from the rear side. In this manner, the cylinder member 3A, the plate member 3B and the bead 4a extending around the inner periphery of the diaphragm 4 are integrally connected together.

A tubular valve body 5 having a sequentially decreasing diameter in the rearward direction is disposed in a movable manner within the enclosed vessel at a location rearward of the power piston 3. As will be described in further detail later, an arrangement is provided in the present embodiment which allows a relative movement in the axial direction, or in the left-and-right direction as viewed in FIG. 1, between the power piston 3 and the valve body 5.

The valve body 5 includes a reduced diameter portion 5a at its rearmost portion, which slidably extends through an annular seal member 6 mounted within an opening 2A of the rear shell 2. The annular seal member 6 maintains a hermetic seal between the outer peripheral surface of the reduced diameter portion 5a of the valve body 5 and the opening 2A of the rear shell 2.

The valve body 5 includes an axial front portion of an increased diameter, in the front end face of which are formed a pair of annular grooves 5b, 5c concentrically. A radially outwardly extending flange 5d is formed on the outer periphery of the front end face of the valve body 5. It is to be understood that a valve mechanism 7, to be described later, is contained within the valve body 5.

The outer peripheral surface which defines the annular groove 5b of the valve body 5 is slidably fitted around the outer periphery of the portion 3b of a reduced diameter of the power piston 3. As a consequence, the flange 5d of the valve body 5 is situated between the portion 3b of a reduced diameter and the tubular outer periphery 3d of the power piston 3, allowing the front end face of the flange 5d and the stepped end face 3c of the cylinder member 3A to be disposed opposite to each other and also enabling them to abut against each other.

A spring 8 is disposed between the stepped end face 3c of the power piston 3 and the opposing bottom of the annular groove 5c of the valve body 5, thus normally urging the power piston 3 and the valve body 5 to be spaced from each other. The flange 5d of the valve body 5 is situated between the tubular outer periphery 3d and the portion 3c of the reduced diameter of the power piston 3, and an annular retainer 9 is fitted against the end face of the tubular outer periphery 3d at a location rearwardly spaced from the flange 5d. In this manner, an axial relative movement between the valve body 5 and the power piston 3 is permitted to a maximum distance by which the flange 5d and the retainer 9 are axially spaced from each other as viewed in FIG. 1.

The diaphragm 4 extends along the plate member 3B on the rear side thereof by having the bead 4a extending around the inner periphery thereof connected to the power piston 3 in the manner mentioned above. A bead, not shown, extending around the outer periphery of the diaphragm 4 is held sandwiched between mating parts, not shown, of the front shell 1 and the rear shell 2. In this manner, the interior of the enclosed vessel is partitioned by the diaphragm 4 into a forwardly located constant pressure chamber A and a rearwardly located variable pressure chamber B.

A reaction piston 13 is slidably fitted around the inner periphery of the portion 3a of an increased diameter of the cylinder member 3A while maintaining a hermetic seal therebetween. The reaction piston 13 comprises a disc-shaped pressure responsive area 13A which extends radially, and a tubular portion 13B of a reduced diameter which is disposed in alignment with the axis of the pressure responsive area 13A and extending rearward. The tubular portion 13B is slidably fitted into the inner periphery of the valve body 5 at its front portion while maintaining a hermetic seal therebetween.

The internal space of the cylinder member 3A which is located forwardly of the pressure responsive area 13A of the reaction piston 13 defines a second variable pressure chamber 14 while the internal space of the cylinder member 3A which is disposed rearward of the pressure responsive area 13A of the reaction piston 13 defines a second constant pressure chamber 15.

The second constant pressure chamber 15 is maintained in communication with the constant pressure chamber A through a radial opening 3e formed in the portion 3a of an increased diameter, and is also in communication with the valve mechanism 7 through a constant pressure passage 26 formed in the valve body 5. On the other hand, the second variable pressure chamber 14 communicates with the valve mechanism 7 through the internal space within the tubular portion 13B, the internal space within the valve body 5 and its continuing axial opening 5e.

A spring 16 is disposed within the second constant pressure chamber 15 between the end face of the pressure responsive area 13A and the valve body 5, thus urging the reaction piston 13 and the valve body 5 in a direction away from each other or in left-and-right direction, while simultaneously urging the reaction piston 13 forwardly within the portion 3a of an increased diameter.

As will be described in detail later, in the inoperative condition shown in FIG. 1, the resilience of the spring 16 causes the reaction piston 13 to be located at its front end within the portion 3a of an increased diameter. At this time, a clearance is maintained between the rear end face 13a of the tubular portion 13B of the reaction piston 13 and the opposing end face 17a of a valve plunger 17.

Figure 3:
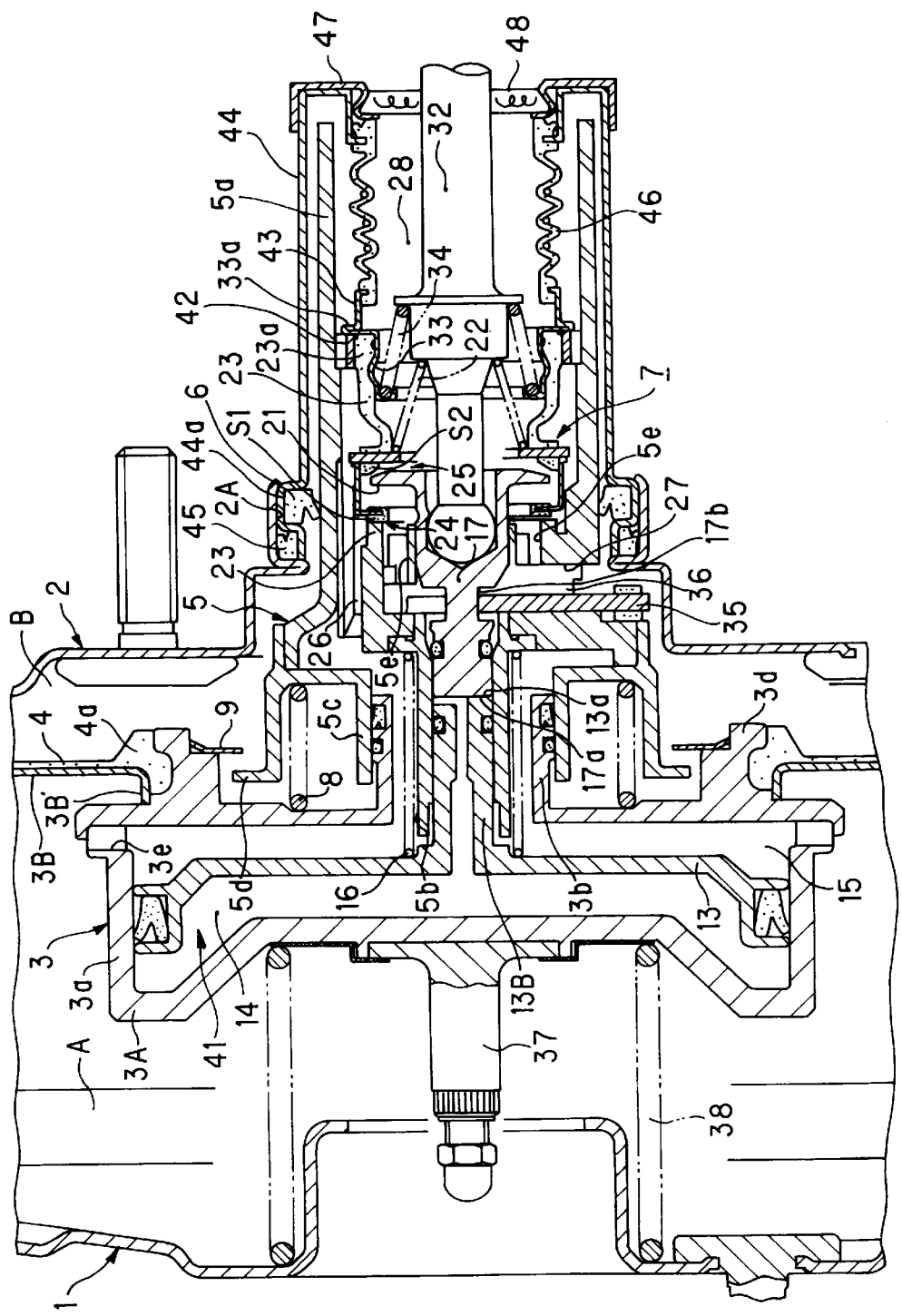
FIG. 3 is a longitudinal section of the brake booster shown in FIG. 1, illustrating its operational condition.

By contrast, when the brake booster is actuated as illustrated in FIG. 3, the reaction piston 13 moves rearward within the portion 3a of an increased diameter, whereby the end face 13a of the tubular portion 13b of the reaction piston 13 abuts against the end face 17a of the valve plunger 17, whereby the force which urges the reaction piston 13 rearward is transmitted as a pseudo-reaction to a brake pedal, not shown.

A valve mechanism 7 which switches a fluid circuit is contained in the portion 5a of a reduced diameter of the valve body 5. The valve mechanism 7 comprises an annular vacuum valve seat 18 formed on a step on the inner peripheral surface of the valve body 5, a valve plunger 17 which is slidably fitted into the valve body 5 from the rear side, an annular atmosphere valve seat 21 formed on a rear end of the valve plunger 17, and a valve element 23 urged from the rear side by a spring 22, or from the righthand side as viewed in FIG. 1, so as to be seated upon either valve seat 18, 21. A combination of the vacuum valve seat 18 and a first seat area S1 on the valve element 23 which moves into engagement with or disengagement from the valve seat 18 defines a vacuum valve 24, and a combination of the atmosphere valve seat 21 and a second seat area S2 on the valve element 23 which moves into engagement with or disengagement from the valve seat 21 defines an atmosphere valve 25.

A space located radially outward of the vacuum valve seat is maintained in communication with the constant pressure chamber A through a constant pressure passage 26 formed in the valve body 5, the second constant pressure chamber 15 formed by the cylinder member 3A and the radial opening 3e. The constant pressure chamber A communicates with an intake manifold of an engine through a tubing, not shown, which is mounted on the front shell 1 for introducing a negative pressure. Accordingly, the negative pressure is normally introduced into the constant pressure chamber A, the second constant pressure chamber 15 and the constant pressure passage 26. It is to be noted that in the present embodiment, the constant pressure passage 26 comprises the annular groove 5b in the valve body 5, and an axial opening which continues from the annular groove and extends rearward to open into a step at a location adjacent to and outward of the vacuum valve seat 18.

A space located intermediate between the vacuum valve seat 18 and the atmosphere valve seat 21 communicates with the variable pressure chamber B through a radial variable pressure passage 27 formed in the valve body 5. Finally, a space located radially inward of the atmosphere valve seat 21 communicates with the atmosphere through an atmosphere passage 28 formed in the valve body 5.

The valve plunger 17 has its rear end pivotally connected with the front end of an input shaft 32, and a spring 34 having a greater resilience than the spring 22 is disposed between the input shaft 32 and a retainer 33 which will be described later. As a consequence, in the inoperative condition of the brake booster as shown in FIG. 1, the second seat area S2 on the valve element 23 is seated upon the atmosphere valve seat 21 to close the atmosphere valve 25 while the first seat area S1 on the valve element 23 is removed from the vacuum valve seat 18 formed on the valve body 5 to open the vacuum valve 24. The other end of the input shaft 32 is coupled to a brake pedal, not shown.

A key member 35 is engaged with a valve plunger 17 to prevent the valve plunger 17 from being disengaged from the valve body in the rearward direction. The key member 35 is known in the art, and is forked at its central portion to extend to its free ends. The key member 35 is inserted into an opening 36 which is formed diametrically in the valve body 5, with the forked portions engaging with a portion 17b of a reduced diameter of the valve plunger 17.

In the present embodiment, the opening 36 into which the key member 35 is inserted and the variable pressure passage 27 are formed integrally so as to be adjacent to each other in the axial direction of the valve body 5. The opening 36 has a width, as measured in a direction orthogonal to the axis of the valve body 5 and also orthogonal to the direction in which the key member 35 is inserted into the opening 36, is greater than the corresponding width of the variable pressure passage 27 as measured in the same direction, whereby the key member 35 is displaceable axially of the valve body 5 only within the opening 36.

The key member 35 and the valve plunger 17 are displaceable axially of the valve body 5 in an extent defined by the axial length of the portion 17b of a reduced diameter. In the inoperative condition of the brake booster as shown in FIG. 1, the key member 35 is maintained in abutment against the wall of the rear shell 2, thus maintaining the key member 35 and the valve plunger 17 at advanced positions relative to the valve body 5. This allows a lost motion of the input shaft 32 to be reduced at the commencement of operation of the brake booster.

The outer periphery of the valve plunger 17 at a location forward of the portion 17b of a reduced diameter which is engaged by the key member 35 has a reduced size as compared with the inner periphery of the valve body 5 in a region where it is fitted. Accordingly, a clearance is maintained between the outer periphery of the valve plunger 17 and the inner periphery of the valve body 5 to maintain a communication between the variable pressure chamber B and the second variable pressure chamber 14 through the variable pressure passage 27, the clearance between the inner peripheral surface of the valve body 5 and the outer peripheral surface of the valve plunger 17, the internal space within the valve body 5 which continues therefrom and the inner periphery of the tubular portion 13B.

In the inoperative condition of the brake booster as shown in FIG. 1, the rear end face 13a of the tubular portion 13B of the reaction piston 13 and the end face 17a of the valve plunger 17, which oppose each other, are spaced apart.

By contrast, when the brake booster is actuated as shown in FIG. 3, the reaction piston 13 moves rearward within the portion 3a of an increased diameter, and its rear end face 13a abuts against the end face 17a of the valve plunger 17, whereby the force which urges the reaction piston 13 rearward can be transmitted as a pseudo-reaction to a driver through a brake pedal, not shown.

An output shaft 37 is disposed within the constant pressure chamber A and has a front end which projects externally of the front shell 1 for connection with a piston of a master cylinder, not shown.

The rear end of the output shaft 37 is connected to the bottom of the cylinder member 3A at its center. Accordingly, a brake reaction which acts on the output shaft 37 when the brake booster is actuated is transmitted to the cylinder member 3A or the power piston 3. When the flange 5d of the valve body 5 is not in abutment against the stepped end face of the power piston 3, the brake reaction is prevented from being transmitted to the valve body 5, and is simultaneously prevented from being transmitted to a brake pedal through the valve plunger 17.

A return spring 38 is disposed between the bottom of the cylinder member 3A (or power piston 3) and the wall of the front shell 1, whereby in the inoperative condition of the brake booster, the key member 35 which abuts against the wall of the rear shell 2 abuts against the end face of the opening 36 formed in the valve body 5 to maintain it in its inoperative position shown. The spring 8 is compressed by the power piston 3 which is urged by the return spring 38, whereby the stepped end face 3c of the cylinder member 3A of the power piston 3 abuts against the end face of the flange 5d of the valve body 5.

In the present embodiment, a brake reaction acting on the output shaft 37 is prevented from being transmitted to a brake pedal, as mentioned previously, thus disabling a driver to obtain a brake feeling. Accordingly, in the present embodiment, pseudo-reaction imparting means 41 is provided so that a pseudo-reaction which depends on the magnitude of the force of depressing the brake pedal can be imparted to a driver.

Specifically, the pseudo-reaction imparting means 41 comprises the reaction piston 13, and the second constant pressure chamber 15 and the second variable pressure chamber 14 which are disposed across the reaction piston 13.

In the inoperative condition of the brake booster as shown in FIG. 1, the end face 13a of the tubular portion 13B of the reaction piston 13 is slightly spaced from the end face 17a of the valve plunger 17.

By contrast, when the brake booster is actuated by driving the valve body 5 forward to move the key member 35 away from the wall of the rear shell 2, the end face 13a of the tubular portion 13B of the reaction piston 13 abuts against the end face 17a of the valve plunger 17, whereby the force which urges the reaction piston 13 rearward can be transmitted as a pseudo-reaction to a brake pedal through the valve plunger 17 and the input shaft 32.

In the present embodiment, the first seat area S1 and the second seat area S2 on the valve element 23 are axially spaced apart and have an equal diameter. In other words, both the vacuum valve 24 and the atmosphere valve 25 have an equal external diameter.

In addition, in the present embodiment, the end 23a of the valve element 23 is not directly connected to the inner periphery of the valve body 5, but is indirectly connected thereto through an interposed annular connection ring 42. In this respect, the present embodiment has improved the configuration of a retainer 33. Specifically, the stepped cylindrical retainer 33 includes a positioning part 33a toward its axial center which extends radially outward, a stop 33b at its front end which is bent to extend radially inward, and another stop 33c at its rear end which is also bent to extend radially inward.

Figure 2:
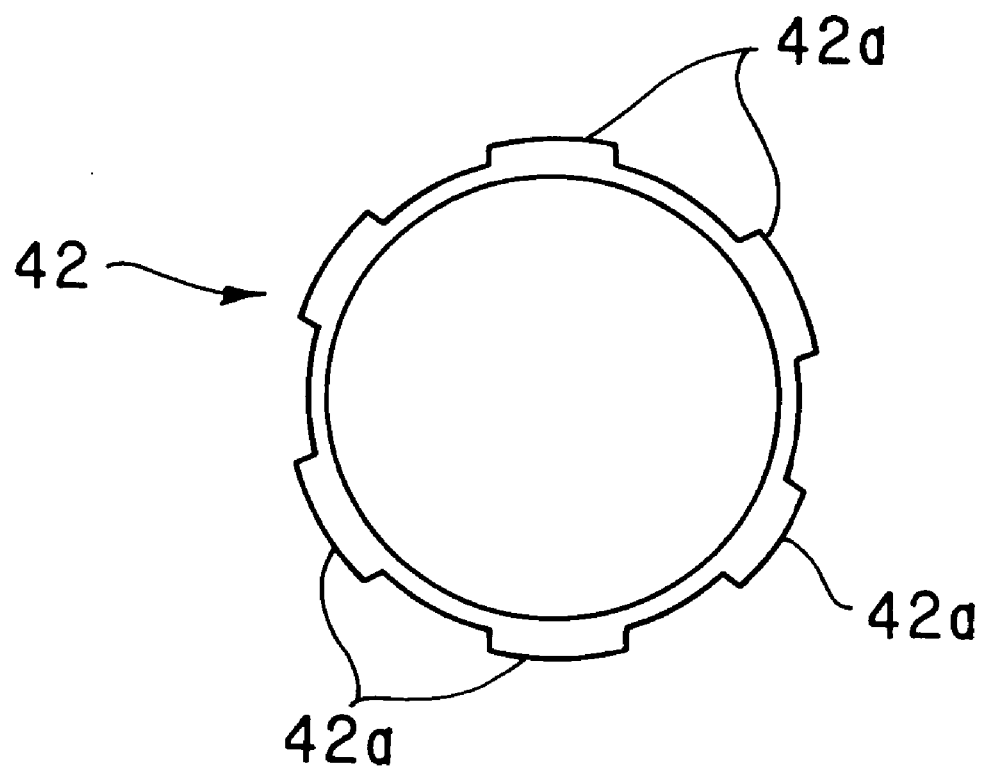
FIG. 2 is a front view of a connection ring 42 shown in FIG. 1.

As shown in FIG. 2, the connection ring 42 is formed with ribs 42a which are circumferentially spaced apart at an equal interval and which extend in the axial direction. Accordingly, when the ribs 42a of the connection ring 42 are fitted into the inner periphery of the portion 5a of a reduced diameter of the valve body 5, axial clearances formed between adjacent ribs 42a to permit a communication between spaces located on the opposite sides of the connection ring 42.

In the present embodiment, the end 23a of the valve element 23 is initially fitted into the inner periphery of the connection ring 42 from the front side, and under this condition, the retainer 33 is fitted inside and forwardly of the end 23a of the valve element 23 so that the positioning part 33a is in abutment against the end face of the end 23a of the valve element 23 and also against the rear end face of the connection ring 42. In this manner, the end 23a is held by the outer periphery of the retainer 33 at its location adjacent to, but forwardly of the positioning part 33a and the inner peripheral surface of the connection ring 42.

The valve element 23, the connection ring 42 and the retainer 33 which are thus integrally assembled together are then inserted into the inner periphery of the portion 5a of the reduced diameter of the valve body 5 until the connection ring 42 is fitted into the location of a positioning step 5f which is formed in the inner periphery of the valve body 5. In this manner, the valve element 23 is connected to the inner periphery of the valve body 5 through the interposed connection ring 42. At this time, the front end of the spring 34 is engaged with the stop 33b of the retainer 33.

A cylindrical cover 44 has its front end connected to the rear shell 2 at the location of the opening 2A, and bellows 46 is disposed between a rear portion of the cover 44 and the retainer 33.

A portion of the cover 44 which is adjacent to, but located rearward of the front end thereof bulges radially outward to define a bulge 44a which is outwardly located and which internally defines an annular groove.

The front end of the cover 44 and the outer peripheral surface of the bulge 44a are fitted into the opening 2A until the front end abuts against the wall of the rear shell 2. The rear edge which defines the opening 2A of the rear shell is caulked inwardly along the rear corner of the bulge 44a, thereby connecting the front end and the bulge 44a of the cover 44 to the opening 2A of the rear shell 2. The annular seal member 6 is mounted in the annular groove which is internally defined inside the bulge 44a, and the inner peripheral surface of the annular seal member 6 is in close contact with the outer peripheral surface of the portion 5a of a reduced diameter of the valve body 5. In this manner, a hermetic seal is maintained between the annular groove internally defined within the bulge 44a and the portion 5a of a reduced diameter of the valve body 5.

A space is defined between the front end face of the bulge 44a and the opposing wall of the rear shell 2 to receive another annular seal member 45, which maintains a hermetic seal between the opening 2A and the outer peripheral surface of the cover 44 at its front end.

At a location rearward of the bulge 44a, the cover 44 has an internal diameter which is chosen to be larger than the external diameter of the portion 5a of a reduced diameter of the valve body 5, thereby maintaining an annular space between the outer peripheral surface of the portion 5a of a reduced diameter of the valve body 5 and the inner peripheral surface of the surrounding cover 44.

The rear end of the cover 44 is folded inwardly to define a hook which surrounds the rear end of the portion 5a of a reduced diameter of the valve body 5 from the rear side, with an end 44b of the cover 44 which is located radially inward of the portion 5a of a reduced diameter being bent to extend radially inward. In this manner, a clearance is also maintained between the bent end of the hook and the rear end of the portion 5a of a reduced diameter of the valve body 5.

The bellows 46 is mounted so as to extend between the inner end 44b of the cover 44 and the rear stop 33c of the retainer 33 in the present embodiment. As a result of such arrangement, the negative pressure which prevails in the constant pressure chamber A and which acts upon on the outer side of the vacuum valve 24 and the valve element 23 through the second constant pressure chamber 15 and the constant pressure passage 26 also prevails in the space defined between the bellows 46 and the inner periphery of its surrounding portion 5a of a reduced diameter and the space defined between the outer peripheral surface of the portion 5a of a reduced diameter and the inner peripheral surface of the cover 44.

An annular retainer 47 which is substantially channel-shaped in section is fitted around the rear end of the cover 44 from the rear side. The rear end of the bellows 46 is axially held sandwiched between the inner peripheral edge of the retainer 47 and the inner end or inner peripheral edge 44b of the cover 44, thus preventing the rear end of the bellows 46 from being disengaged from the inner end 44b of the cover 44. A combined filter and silencer 48 is attached around the inner periphery of the retainer 47.

The bellows 46 has an effective diameter which is substantially the same size as the diameters of the atmosphere valve 45 and the vacuum valve 24. The purpose of such an arrangement is to prevent the pressure differential between the atmospheric pressure within the variable pressure chamber B and the atmospheric pressure outside the brake booster from acting upon the valve body 5 when the brake booster is actuated or when the first seat area S1 on the valve element 23 is seated on the vacuum valve seat 18 to close the vacuum valve 24 and the second seat area S2 on the valve element 23 moves away from the atmosphere valve seat 21 to open the atmosphere valve 25.

Operation

In the inoperative condition of the brake booster as shown in FIG. 1, the second seat area S2 on the valve element 23 is seated on the atmosphere valve seat 21 to close the atmosphere valve 25 while the first seat area S1 on the valve element 23 is removed from the vacuum valve seat 18 to open the vacuum valve 24. Accordingly, a communication is established between the constant pressure chamber A and the variable pressure chamber B, into both of which the negative pressure is introduced. As a consequence, the negative pressure is also introduced into the second variable pressure chamber 14 and the second constant pressure chamber 15, and is also introduced into the space which is surrounded by the outer periphery of the bellows 46 and the inner periphery of the cover 44. The key member 35 is in abutment against the wall of the rear shell 2, and hence the spring 8 is compressed, whereby the flange 5d of the valve body 5 abuts against the stepped end face 3c of the power piston 3. The reaction piston 13 is located at its foremost position within the portion 3a of an increased diameter under the resilience of the spring 16, with the rear end face 13a of the reaction piston 13 being slightly spaced from the end face 17a of the valve plunger 17.

If the brake pedal is now depressed to drive the input shaft 32 and the valve plunger 17 forward, the second seat area S2 on the valve element 23 moves away from the atmosphere valve seat 21 to open the atmosphere valve 25 while the first seat area S1 on the valve element 23 becomes seated upon the vacuum valve seat 18 to close the vacuum valve 24, as shown in FIG. 3.

Accordingly, the atmosphere is introduced into the variable pressure chamber B, whereby the pressure differential between the negative pressure in the constant pressure chamber A and the atmospheric pressure in the variable pressure chamber B drives the power piston 3 forward. The output shaft 37 is then driven forward in an integral manner with the power piston 3, thus producing a braking liquid pressure in a master cylinder. At this time, brake reaction produced by the braking liquid pressure is transmitted through the output shaft 37 to be accepted entirely by the power piston 3, and therefore cannot be transmitted to the valve plunger 17. Thus, the brake reaction is not transmitted to the brake pedal, not shown.

On the other hand, when the atmosphere is introduced into the variable pressure chamber B, it is also introduced into the second variable pressure chamber 14, whereby the reaction piston 13 is driven rearward relative to the portion 3a of an increased diameter under the influence of the pressure differential between the negative pressure in the second constant pressure chamber 15 and the atmospheric pressure in the second variable pressure chamber 14.

As mentioned previously, a clearance is maintained between the end face 13a of the reaction piston 13 and the end face 17a of the valve plunger 17 in the inoperative condition shown in FIG. 1 where the key member 35 abuts against the inner wall of the rear shell 2 and also immediately after the power piston 3 is driven forward, and accordingly, a pseudo-reaction which is acting on the reaction piston 13 cannot be transmitted to the valve plunger 17.

By contrast, the pressure differential between the constant pressure chamber A and the variable pressure chamber B acts upon the valve body 5 also, whereby the valve body 5 is also driven forward as the power piston 3 is driven forward. When the valve body 5 is driven forward and the key member 35 moves away from the wall of the rear shell 2, the key member 35 is allowed to retract relative to the valve body 5, while the reaction piston 13 is driven rearward with respect to the portion 3a of an increased diameter, thus causing the end face 13a of the reaction piston 13 to abut against the end face 17a of the valve plunger 17 (FIG. 3). In this manner, the force which urges the reaction piston 13 or the pseudo-reaction is transmitted to a brake pedal, not shown, through the valve plunger 17 and the input shaft 32.

In a servo balance condition reached in an intermediate load region of the brake booster, a balance is reached for the power piston 3 between the retracting force produced by the brake reaction from the output shaft 37 and the resilience of the return spring 38 and the advancing force produced by the pressure differential between the constant pressure chamber A and the variable pressure chamber B.

A balance is also reached for the valve body 5 between the retracting force produced by the resiliences of the springs 8, 16 and the advancing force produced by the pressure differential between the second constant pressure chamber 15 and the variable pressure chamber B.

A balance is also reached for the reaction piston 13 between the retracting force produced by the pressure differential between the second constant pressure chamber 15 and the second variable pressure chamber 14 and the advancing force produced by the resilience of the spring 16 and the depression of the brake pedal by a driver or the advancing force of the valve plunger 17.

It will be understood from the servo balance condition that the amount of relative movement of the power piston 3 and the valve body 5 with respect to the brake pedal depressing force or the output from the brake booster can be determined in terms of parameters of the springs 8, 16 and the pressure responsive areas. In the present embodiment, an axial relative movement between the power piston 3 and the valve body 5 is permitted, and this reduces the stroke by which the valve body is advanced with respect to the stroke by which the power piston 3 is advanced.

In other words, it is necessary that the output shaft 37 which is subject to the brake reaction be advanced through a relatively large stroke in order to compensate for a piston stroke of a master cylinder, not shown, that is, a stroke from the beginning of an advancing movement of the piston of the master cylinder until a braking liquid pressure increases substantially. By contrast, in the present embodiment, the amount of relative movement between the power piston 3 and the valve body 5 can be determined in accordance with the output from the brake booster, and this allows the stroke by which the valve body 5 is advanced to be reduced with respect to the stroke by which the power piston 3 is advanced. As a consequence, the stroke of the input shaft 32, and hence its coupled brake pedal, which is driven forward as the valve body 5 is driven forward, can be reduced in a relative sense, thereby improving the brake feeling.

Figure 4:
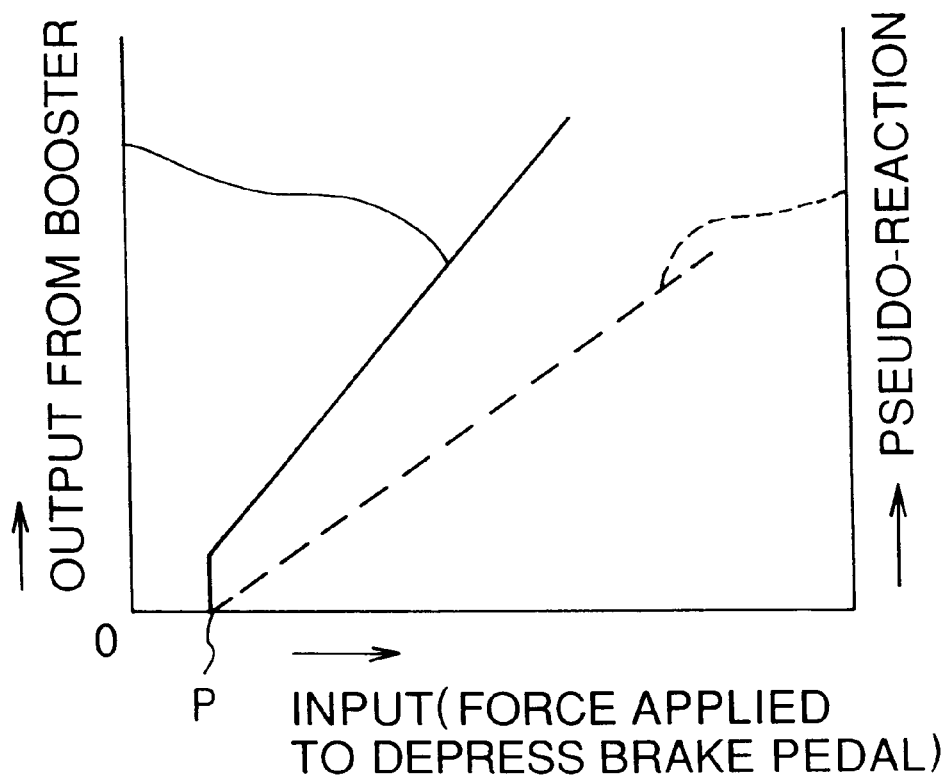
FIG. 4 graphically shows a characteristic diagram of the embodiment.

FIG. 4 graphically illustrates a relationship between the brake pedal depressing force and the pseudo-reaction which is transmitted to a driver. In FIG. 4, a point P represent the time when the end face 13a of the reaction piston 13 abuts against the end face 17a of the valve plunger 17.

Thus, in the present embodiment, at the commencement of depression of the brake pedal, the end face 13a of the reaction piston 13 is spaced from the end face 17a of the valve plunger 17, and the pseudo-reaction begins to be transmitted to a driver from the time on when the brake booster is actuated to bring the end face 13a of the reaction piston 13 into abutment against the end face 17a of the valve plunger 17.

As mentioned previously, a balance is reached for the reaction piston 13 between the retracting force produced by the pressure differential between the second constant pressure chamber 15 and the second variable pressure chamber 14 and the advancing force produced by the resiliences of the springs 8, 16 and the brake pedal depressing force from a driver or the advancing force of the valve plunger 17. Accordingly, the retracting force produced by the pressure differential between the second constant pressure chamber 15 and the second variable pressure chamber 14 is principally transmitted as a pseudo-reaction to the brake pedal. The pseudo-reaction corresponds to the pressure differential between the second constant pressure chamber 15 and the second variable pressure chamber 14, which in turn corresponds to the pressure differential between the constant pressure chamber A and the variable pressure chamber B, which in turn corresponds to the force with which the brake pedal is depressed.

Accordingly, even though a reaction disc which is usually provided in a conventional brake booster is omitted, a jumping response is available as in a conventional brake booster from the time on when the end face 13a of the piston 13 is brought into abutment against the end face 17a of the valve plunger 17, subsequently transmitting a pseudo-reaction which depends on the depression of the brake pedal to a driver. This improves the brake feeling experienced by a driver in comparison to an arrangement in which the pseudo-reaction is immediately imparted to a driver upon initiation of depression of the brake pedal.

In the present embodiment, the vacuum valve 24, the atmosphere valve 25 and bellows 46 have their effective diameters chosen to be substantially equal to each other, and the negative pressure also prevails in the space defined between the bellows 46 and the inner periphery of the portion 5a of a reduced diameter. This arrangement is effective to prevent the pressure differential between the atmospheric pressure in the variable pressure chamber B and the atmospheric pressure outside the both shells 1, 2 from acting upon the valve body 5 as the brake booster is actuated. Accordingly, if the negative pressure in the constant pressure chamber A varies for some reason, the same output can be obtained from the brake booster as long as the brake pedal is depressed with the same force. In other words, if the arrangement is made such that the same output is obtained, if the negative pressure in the constant pressure chamber A varies as the brake booster is actuated, the stroke by which the brake pedal is depressed assumes a constant value which depends on the output. This assures a good brake feeling experienced by a driver.

In addition, because the pressure differential between the atmospheric pressure within the variable pressure chamber B and the atmospheric pressure outside the both shells 1, 2 is prevented from acting upon the valve body 5 as the brake booster is actuated in the present embodiment, the load to which the return spring 38 is preset can be reduced than in the prior art. If the preset load is reduced, there is no influence upon the returning rate.

The operation during a quick braking remains basically the same as the normal operation, but it is to be noted that in the present embodiment, the second variable pressure chamber 14 and the variable pressure passage 27 communicate with each other through a clearance defined by the inner peripheral surface of the tubular portion 13B, the inner peripheral surface of the valve body 5 and the outer periphery of the valve plunger 17, which is substantially an orifice passage. Accordingly, during a quick braking, if the pressure in the variable pressure passage 27 and the variable pressure chamber B increases rapidly, the pressure in the second variable pressure chamber 14 will rise in retarded relationship to the pressure rise which occurs in the variable pressure chamber B. As a consequence, a pseudo-reaction which is imparted by the pseudo-reaction imparting means 41 to a brake pedal will be reduced during a quick braking than in a normal braking operation, thus avoiding an abnormally high rise during a quick braking, as would be found for a brake reaction in a conventional arrangement. This allows a braking force of an increased magnitude to be obtained with a relatively low force of depression during a quick braking, thus enabling a powerless driver such as an aged or a female driver to exercise a quick braking operation in a positive manner.

Second Embodiment

Figure 5:
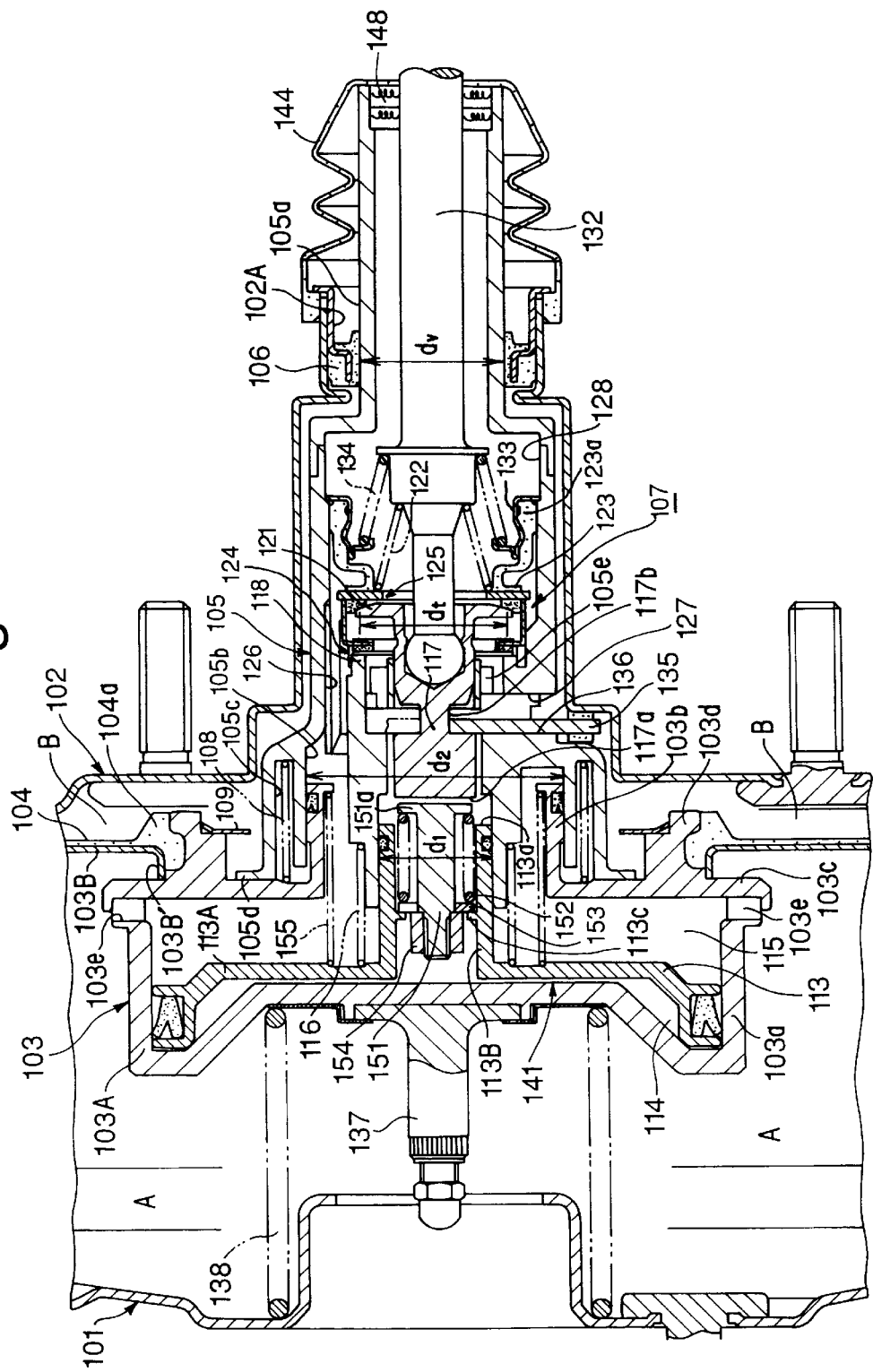
FIG. 5 is a longitudinal section of a second embodiment of the invention.

FIG. 5 shows a second embodiment of the invention in which the construction of a reaction piston 113 is improved and a rear portion 105a of a reduced diameter of a valve body 105 and associated parts are also improved.

Specifically, the reaction piston 113 has a tubular portion 113B which has an increased diameter in comparison to that of the first embodiment and which is internally formed with a stop 113c, formed by an annular protrusion, located toward the axial center thereof. A transmitting member 151 in the form of a solid cylinder is disposed inside the tubular portion 113B. The transmitting member 151 is formed with a flange around its outer periphery at its rear end while the outer periphery of the front portion thereof is threaded. A spring 152 is fitted around the outer periphery of the transmitting member 151 from the front side, with its rear end abutting against the flange. Subsequently, an arcuate retainer 153 is fitted around the outer periphery of the transmitting member 151 from the front side to provide an abutment against which the front end of the spring 152 abuts. A nut 154 is slidably engaged with the thread of the transmitting member 151, causing the retainer 153 which is urged by the spring 152 to abut against the nut 154. The nut 154 has an external diameter which is less than the internal diameter of the stop 113c. The retainer 153, the spring 152 and the flange each have an external diameter which is larger than the internal diameter of the stop 113c and slightly less than the internal diameter of the tubular portion 113B. The transmitting member 151 is inserted into the tubular member 113B from the rear side until the retainer 153 abuts against the stop 113c. Under the condition shown in FIG. 5 where the retainer 153 abuts against the nut 154 or when the spring 152 is not compressed, the rear end face 151a of the transmitting member 151 projects rearward of the rear end 113a of the tubular portion 113B, thus opposing a front end face 117a of a valve plunger 117. It is to be understood that the transmitting member 151, the retainer 153, the nut 154 and the spring 152 form part of the reaction piston 113. The spring 152 disposed on the transmitting member 151 can be adjusted to a preset length by adjusting the degree of threadable engagement of the nut 154 with the thread in the transmitting member 151. This allows a fine adjustment of a distance by which the rear end face 151a of the transmitting member 151 is spaced from the front end face 117a of the opposing valve plunger 117.

While the transmitting member 151 is disposed inside the tubular portion 113B, a clearance is formed between the inner peripheral surface of the tubular portion 113B and the outer peripheral surface of the transmitting member 151, and thus a second variable pressure chamber 114 can communicate with internal space within the valve body 105 which is located rearward of the tubular portion 113B through the clearance.

In the second embodiment, a spring 155 is disposed between a pressure responsive area 113A of the reaction piston 113 and the inner periphery of a portion 103b of a reduced diameter of a power piston 103, and has a resilience which is less than the resilience of a spring 116 which is disposed inwardly thereof. In the inoperative condition of the brake booster as shown in FIG. 5, the end face 151a of the transmitting member 151 is slightly spaced from and opposes the end face 117a of the valve plunger 117.

Figure 6:
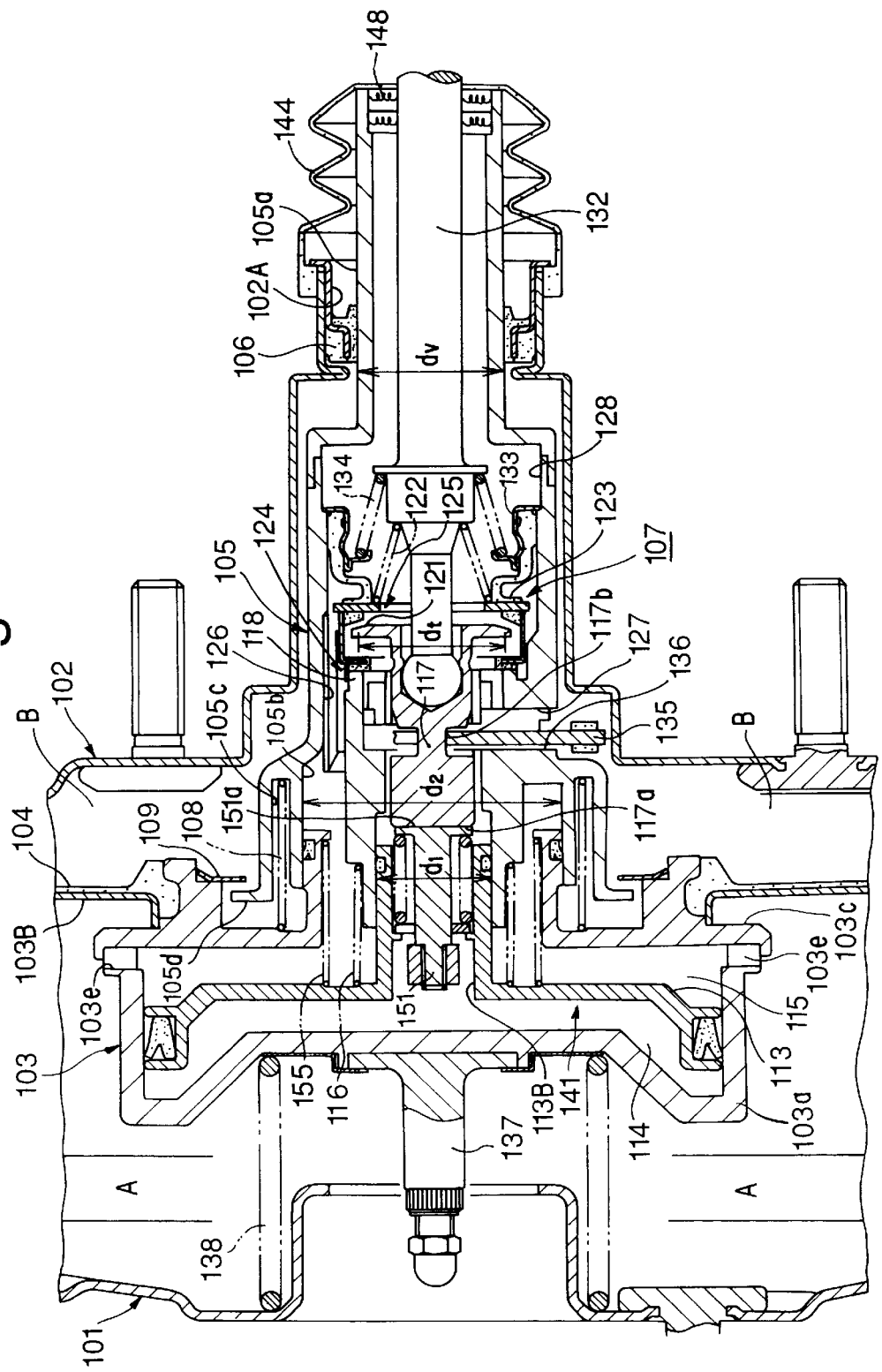
FIG. 6 is a longitudinal section of the brake booster shown in FIG. 5, illustrating its operational condition.

By contrast, in the operative condition of the brake booster shown in FIG. 6 where the valve body 105 is driven forward and a key member 135 is spaced from the wall of a rear shell 102, the end face 151a of the transmitting member 151 abuts against the end face 117a of the valve plunge 117, thus allowing the force which urges the reaction piston 113 to be transmitted as a pseudo-reaction to a brake pedal through the valve plunger 117 and an input shaft 132.

In the second embodiment, a base end 123a of a valve element 123 is directly fitted into the inner periphery of the valve body 105 by the action of a tubular retainer 133, generally in the similar manner as in a known arrangement. An annular seal member 106, which is known in itself, is disposed at the location of an opening 102A in the rear shell 102, thus maintaining a hermetic seal between the opening 102A and a portion 105a of a reduced diameter of the valve body 105. A cover 144, which is constructed as known in the prior art, is mounted across the rear end of the rear shell 102, defined by the location of the opening 102A, and the rear end of the valve body 105.

It is a most significant feature of the second embodiment that a diameter dt of an atmosphere valve seat 121 and an external diameter dv of the portion 105a of a reduced diameter of the valve body 105 at a location where it extends through the annular seal member 106 are chosen to be of an equal size. Thus, in the second embodiment, the diameter of a vacuum valve seat 118, the diameter dt of the atmosphere valve seat 121 and the external diameter dv of the portion 105a of a reduced diameter are all of an equal size. As a consequence of such an arrangement, the pressure differential between the pressure in a variable pressure chamber B and the atmosphere located outside the brake booster is prevented from acting upon the valve body 105 as the brake booster is actuated, that is, when the valve element 123 is seated on the vacuum valve seat 118 to close a vacuum valve 124 and the valve element 123 is removed from the atmosphere valve seat 121 to open an atmosphere valve 125. In other respects, the arrangement is similar to the first embodiment mentioned above, and accordingly, corresponding parts are designated by like numerals as used before, to which 100 is added.

Operation

In the inoperative condition of the brake booster shown in FIG. 5, the valve element 123 is seated on the atmosphere valve seat 121 and is removed from the vacuum valve seat 118. Accordingly, a constant pressure chamber A and a variable pressure chamber B communicate with each other, and a negative pressure is introduced into the both chambers A, B. The negative pressure is also introduced into the second variable pressure chamber 114 and the second constant pressure chamber 115. The key member 135 abuts against the wall of the rear shell 102, and thus a spring 108 is compressed to cause a flange 105d of the valve body 105 to abuts against a stepped end face 103c of a power piston 103. The reaction piston 113 is situated at its foremost position within a portion 103a of an increased diameter under the resiliences of the springs 155, 116, and the end face 151a of the transmitting member 151 is slightly spaced from the end face 117a of the valve plunger 117.

If a brake pedal is now depressed to drive the input shaft 132 and the valve plunger 117 forward, the atmosphere valve 125 is opened while the vacuum valve 124 is closed as shown in FIG. 6. This allows the atmosphere to be introduced into the variable pressure chamber B, and the pressure differential between the negative pressure in the constant pressure chamber A and the atmospheric pressure in the variable pressure chamber B drives the power piston 103 forward. An output shaft 137 is then driven forward in an integral manner with the power piston 103, thus producing a braking liquid pressure in a master cylinder. At this time, a brake reaction caused by the braking liquid pressure is transmitted through the output shaft 137 and is entirely accepted by the power piston 103, and thus is not transmitted to the valve plunger 117. Thus, the brake reaction is not transmitted to a brake pedal, not shown.

On the other hand, as the atmosphere is introduced into the variable pressure chamber B, it is also introduced into the second variable pressure chamber 114, whereby the pressure differential between the negative pressure in the second constant pressure chamber 115 and the atmospheric pressure in the second variable pressure chamber 114 drives the reaction piston 113 rearward with respect to the portion 103a of an increased diameter.

Since a clearance is maintained between the end face 151a of the transmitting member 151 and the opposing front end face 117a of the valve plunger 117 in the inoperative condition shown in FIG. 5 where the key member 135 abuts against the inner wall of the rear shell 102 and also immediately after the power piston 103 is driven forward, a pseudo-reaction which acts upon the reaction piston 113 cannot be transmitted to the valve plunger 117.

However, because the pressure differential between the constant pressure chamber A and the variable pressure chamber B acts upon the valve body 105, it is also driven forward as the power piston 103 is driven forward. When the valve body 105 is driven forward and the key member 135 moves away from the internal wall of the rear shell 102, the key member 135 is allowed to retract relative to the valve body 105, and because the reaction piston 113 is driven rearward with respect to the portion 103a of an increased diameter, the end face 151a of the transmitting member 151 is brought into abutment against the opposing front end face 117a of the valve plunger 117 (FIG. 6). In this manner, the pseudo-reaction which acts upon the reaction piston 113 is transmitted to a brake pedal through the valve plunger 117 and the input shaft 132.

In a servo balance condition reached in an intermediate load region of the brake booster, a balance is achieved for the power piston 103 between the retracting force produced by the brake reaction from the output shaft 137 and the resilience of a return spring 138 and the advancing force produced by the pressure differential between the constant pressure chamber A and the variable pressure chamber B.

A balance is also achieved for the valve body 5 between the retracting force produced by the resiliences of springs 108, 116 and the advancing force produced by the pressure differential between the second constant pressure chamber 115 and the variable pressure chamber B.

A balance is also achieved for the reaction piston 113 between the retracting force produced by the pressure differential between the second constant pressure chamber 115 and the second variable pressure chamber 114 and the advancing force produced by the resiliences of the springs 155, 116, 152 and the brake pedal depressing force from a driver or the advancing force of the valve plunger 117.

It will be appreciated from these servo balance conditions that the amount of relative movement of the power piston 103 and the valve body 105 with respect to the brake pedal depressing force or the output from the brake booster can be determined by parameters of respective springs 108, 155, 116, 152 and pressure responsive areas. In the present embodiment, an axial relative movement is permitted between the power piston 103 and the valve body 105, and accordingly, the stroke by which the valve body 105 is advanced is reduced than the stroke by which the power piston 103 is advanced.

Thus it will be seen that the output shaft 137 which is subject to the brake reaction must be advanced through a relatively increased stroke in order to compensate for a piston stroke of a master cylinder, not shown, that is, a stroke from the beginning of an advancing motion of the piston of the master cylinder until a braking liquid pressure is substantially increased. By contrast, the amount of relative movement between the power piston 103 and the valve body 105 can be determined in accordance with an output from the brake booster in the present invention. In this manner, the stroke by which the valve body 105 is advanced is reduced than the stroke by which the power piston 103 is advanced. As a consequence, the stroke of the input shaft 132 which is driven forward as the valve body 105 is driven forward, and hence of its coupled brake pedal, can be reduced in a relative sense, thus improving a brake feeling.

Figure 7:
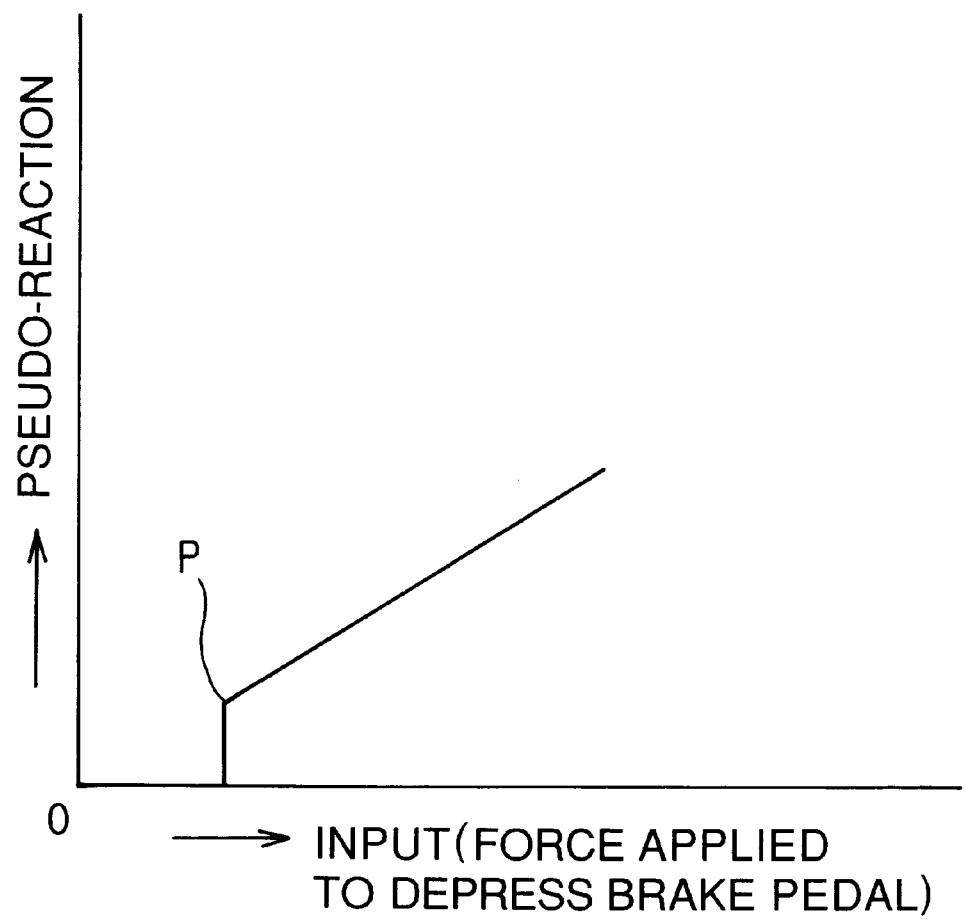
FIG. 7 graphically shows a characteristic diagram of the second embodiment.

FIG. 7 graphically shows a relationship between the brake pedal depressing force and the pseudo-reaction which is transmitted to a driver. In FIG. 7, a point P indicates the time when the end face 151 of the transmitting member 151 associated with the reaction piston 113 abuts against the end face 117a of the valve plunger 117.

Specifically, in the present embodiment, the end face 151 of the transmitting member 151 associated with the reaction piston 113 is spaced from the valve plunger 117 at the commencement of depression of the brake pedal, and the pseudo-reaction is transmitted to a driver from the time on when the end face 151a of the transmitting member 151 associated with a reaction piston 113 abuts against the end face 117a of the valve plunger 117 in response to the actuation of the brake booster.

As mentioned previously, a balance is achieved for the reaction piston 113 between the retracting force produced by the pressure differential between the second constant pressure chamber 115 and the second variable pressure chamber 114 and the advancing force produced by the resilience of the springs 155, 116, 152, and the brake pedal depressing force from a driver or the advancing force of the valve plunger 117, and accordingly, the retracting force produced by the pressure differential between the second constant pressure chamber 115 and the second variable pressure chamber 114 is principally transmitted as a pseudo-reaction to the brake pedal. The pseudo-reaction corresponds to the pressure differential between the second constant pressure chamber 115 and the second variable pressure chamber 114, which in turn corresponds to the pressure differential between the constant pressure chamber A and the variable pressure chamber B, which in turn corresponds to the brake pedal depressing force.

Consequently, despite the fact that a reaction disc which is usually provided in a conventional brake booster is omitted, a jumping response which is similar to that obtained in a conventional brake booster is available from the time on when the end face 151a of the transmitting member 151 associated with the reaction piston 113 abuts against the valve plunger 117, subsequently transmitting a pseudo-reaction which depends on the depression of the brake pedal to a driver. This provides a better brake feeling to a driver than when a pseudo-reaction is imparted to a driver from the beginning of depression of the brake pedal.

In the present embodiment, the diameter dt of the atmosphere valve seat 121 and the diameter dv of the portion of a reduced diameter of the valve body 105 are chosen to be of an equal size. This allows the pressure differential between the atmospheric pressure within the variable pressure chamber B and the atmospheric pressure outside the both shells 101, 102 to be prevented from acting upon the valve body 105 as the brake booster is actuated. As a consequence, if the negative pressure in the constant pressure chamber A varies for some reason, the same output can be obtained from the brake booster as long as the brake pedal is depressed with a same force. In other words, if the arrangement is provided that the same output is obtained for any variation in the negative pressure in the constant pressure chamber A as the brake booster is actuated, the stroke of the brake pedal will be a constant value which depends on the output. This allows a better brake feeling to be provided to a driver.

For a more detailed description of this, it is assumed that the force acting upon the valve body 105 due to the pressure differential when the brake booster is actuated by F, the diameter of the atmosphere valve seat 121 by dt, the diameter of the portion 105a of a reduced diameter of the valve body 105 by dv, the internal diameter of the valve body 105 at a location where the tubular portion of the reaction piston 113 is fitted by d1, and the internal diameter of the valve body 105 where the portion 103b of a reduced diameter of the power piston 103 is fitted by d2, all as shown in FIG. 5, and assuming a pressure P0 in the constant pressure chamber A and a pressure ΔP in the variable pressure chamber, the following relationship applies;

$$F = \{(d2^2 - d1^2) \times (\Delta P - P0) + (dt^2 - dv^2) \times \Delta P\} \times \pi/4 + K$$

where K represents the resilience of the springs 134, 122, which remains substantially constant. Assuming that the force with which the brake pedal is depressed remains constant and the pressure P0 in the constant pressure chamber A varies by αP, the pressure ΔP in the variable pressure chamber also varies by αP. Accordingly, for a constant force which is used to depress the brake pedal, (ΔP−P0) remains constant, and an output from the brake booster is constant. However the magnitude of F varies by $(dt^2 - dv^2) \times \alpha P \times \pi/4$, which causes a change in the amount of relative movement between the valve body 105 and the power piston 103, thus changing the depression stroke of the brake pedal.

However, in the present embodiment, the external diameter dv of the portion 105a of a reduced diameter is chosen to be equal to the diameter dt of the atmosphere valve seat 121, thus nullifying the term $(dt^2 - dv^2) \times \Delta P$ in the above equation. This avoids any substantial variation in the relationship between the depression stroke of the brake pedal and the output generated even if the negative pressure in the constant pressure chamber A varies. In this manner, a better brake feeling than experienced in the prior art is imparted to a driver.

In the foregoing, the diameter dt of the atmosphere valve seat 121 and the external diameter dv of the portion 105a of a reduced diameter of the valve body 105 are described as being chosen to be of an equal size in the second embodiment, but it should be understood that these sizes need not be equal to each other strictly, but may be substantially equal to each other inclusive of manufacturing tolerances.

While the invention has been shown and described above in connection with several embodiments thereof, it should be understood that a number of changes, modifications and substitutions therein are possible from the above disclosure without departing from the spirit and scope of the invention defined by the appended claims.

What is claimed is:

1. A brake booster including a tubular valve body slidably disposed within a shell and having a rear tubular portion, the outer periphery of which slidably extends through an opening in the shell while maintaining a hermetic seal, a power piston mounted on the valve body, a constant and a variable pressure chamber defined across the power piston, a valve mechanism disposed within the valve body, a constant pressure passage which provides a communication between the valve mechanism and the constant pressure chamber, a variable pressure passage which provides a communication between the valve mechanism and the variable pressure chamber, an atmosphere passage which provides a communication between the valve mechanism and the atmosphere, an input shaft coupled to the valve mechanism and is adapted to be driven back and forth in response to a brake pedal, and an output shaft driven forward as the valve body is driven forward, an axial relative movement being permitted between the valve body and the power piston, and the valve mechanism including a vacuum valve seat formed on an inner periphery of the valve body, a valve plunger slidably fitted into the valve body and coupled to the input shaft, an annular atmosphere valve seat formed on a rear part of the valve plunger, and a valve element urged forwardly by a spring for movement into engagement with or disengagement from the both valve seats;

characterized by an arrangement which prevents a reaction applied to the output shaft from being transmitted to the valve plunger as the brake booster is actuated;

further comprising a reaction piston slidably disposed on either the power piston or the valve body;

pseudo-reaction imparting means for transmitting to the valve plunger a force which urges the reaction piston due to a pressure differential between the variable pressure chamber and the constant pressure chamber as a pseudo-reaction;

a tubular cover connected to said opening of the shell and surrounding said rear tubular portion of the valve body;

and bellows disposed between a rear end of the tubular cover and an end of the valve element which is fitted into the inner periphery of the valve body, a space being defined between the tubular cover and the bellows and communicating with the constant pressure chamber;

a diameter of the vacuum valve seat, a diameter of the atmosphere valve seat and an effective diameter of the bellows being chosen to be substantially equal to each other.

2. A brake booster according to claim 1 in which the end of the valve element is fitted into the inner periphery of the valve body through an annular connection ring interposed therebetween, the connection ring being formed with a plurality of communication paths which allow the spaces located on the opposite sides thereof to communicate with each other.

3. A brake booster according to claim 1 in which the rear end of the tubular cover is provided with a retainer which engages the rear end of the bellows, a silencer being disposed within the inner periphery of the retainer.

4. A brake booster including a tubular valve body slidably disposed within a shell and having a rear end, the outer periphery of which slidably extends through an opening in the shell while maintaining a hermetic seal, a power piston mounted on the valve body, a constant and a variable pressure chamber defined across the power piston, a valve mechanism disposed within the valve body, a constant pressure passage which provides a communication between the valve mechanism and the constant pressure chamber, a variable pressure passage which provides a communication between the valve mechanism and the variable pressure chamber, an atmosphere passage which provides a communication between the valve mechanism and the atmosphere, an input shaft coupled to the valve mechanism and is adapted to be driven back and forth in response to a brake pedal, and an output shaft driven forward as the valve body is driven forward, an axial relative movement being permitted between the valve body and the power piston, and the valve mechanism including a vacuum valve seat formed on the inner periphery of the valve body, a valve plunger slidably fitted into the valve body and coupled to the input shaft, an annular atmosphere valve seat formed on a rear part of the valve plunger, and a valve element urged forwardly by a spring for movement into engagement with or disengagement from the both valve seats;

characterized by an arrangement which prevents a reaction applied to the output shaft from being transmitted to the valve plunger as the brake booster is actuated;

further comprising a reaction piston slidably disposed on either the power piston or the valve body;

and pseudo-reaction imparting means for transmitting to the plunger a force which urges the reaction piston due to a pressure differential between the variable pressure chamber and the constant pressure chamber as a pseudo-reaction;

the outer periphery of the valve body having an external diameter at a location where it extends through the opening in the shell which is substantially equal to a diameter of the atmosphere valve seat.

5. A brake booster according to claim 4 in which the power piston comprises a bottomed, stepped cylinder member including a portion of a reduced diameter which is slidably fitted into the valve body, and a portion of an increased diameter which slidably receives the reaction piston and which is divided by the reaction piston into a second variable pressure chamber and a second constant pressure chamber, the reaction piston including a tubular portion which is slidably fitted into the inner periphery of the valve body and being urged rearward, there being disposed within the tubular portion a transmitting member which opposes a front end face of the valve plunger and means for urging the transmitting member rearward relative to the tubular portion, the second variable pressure chamber being maintained in communication with the variable pressure chamber through the tubular portion and the second constant pressure chamber being maintained in communication with the constant pressure chamber and the constant pressure passage.

6. A brake booster according to claim 5 in which said means for urging the transmitting member rearward comprises a spring, further comprising means for adjusting a preset length of the spring.

* * * * *